(12) United States Patent
Hon et al.

(10) Patent No.: US 7,797,850 B2
(45) Date of Patent: Sep. 21, 2010

(54) CONTACT TYPE MEASURING INSTRUMENT

(75) Inventors: Yonpyo Hon, Yamanashi (JP); Kenzo Ebihara, Yamanashi (JP); Akira Yamamoto, Yamanashi (JP); Masayuki Hamura, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 135 days.

(21) Appl. No.: 12/335,688

(22) Filed: Dec. 16, 2008

(65) Prior Publication Data

US 2009/0235397 A1 Sep. 17, 2009

(30) Foreign Application Priority Data

Mar. 12, 2008 (JP) .............................. 2008-063223

(51) Int. Cl.
*G01B 7/00* (2006.01)
(52) U.S. Cl. .......................................... 33/559; 33/556
(58) Field of Classification Search ........... 33/557–561, 33/503, 549, 558.01
See application file for complete search history.

(56) References Cited

U.S. PATENT DOCUMENTS

| 4,455,754 | A | * | 6/1984 | Benjamin | 33/557 |
| 5,005,297 | A | * | 4/1991 | Aehnelt et al. | 33/559 |
| 6,912,795 | B1 | * | 7/2005 | Kennedy et al. | 33/517 |
| 7,464,483 | B2 | * | 12/2008 | Schopf et al. | 33/558 |
| 7,685,733 | B2 | * | 3/2010 | Ohmori et al. | 33/559 |
| 2007/0006473 | A1 | * | 1/2007 | Schopf et al. | 33/558 |
| 2007/0126314 | A1 | * | 6/2007 | Ohmori et al. | 310/316.01 |
| 2008/0101881 | A1 | * | 5/2008 | Hon et al. | 409/214 |
| 2008/0201005 | A1 | * | 8/2008 | Hon et al. | 700/109 |
| 2008/0249741 | A1 | * | 10/2008 | Hon et al. | 702/168 |
| 2009/0265946 | A1 | * | 10/2009 | Jordil et al. | 33/503 |
| 2009/0292503 | A1 | * | 11/2009 | Hon et al. | 702/168 |
| 2009/0300930 | A1 | * | 12/2009 | Ishikawa | 33/559 |
| 2010/0030368 | A1 | * | 2/2010 | Hon et al. | 700/195 |
| 2010/0101105 | A1 | * | 4/2010 | Hon et al. | 33/503 |

FOREIGN PATENT DOCUMENTS

| EP | 0471371 A2 | 2/1992 |
| JP | 2007-155440 A | 6/2007 |
| JP | 2007-170951 A | 7/2007 |
| WO | 0022373 A1 | 4/2000 |

OTHER PUBLICATIONS

EP Search Report for EP 08106001.4-1524 mailed Jun. 24, 2009.

* cited by examiner

*Primary Examiner*—Yaritza Guadalupe-McCall
(74) *Attorney, Agent, or Firm*—Lowe Hauptman Ham & Berner LLP

(57) ABSTRACT

There is provided a contact type measuring instrument in which the contact force of a probe is adjusted by a force created by compressed air and an attraction force between a permanent magnet and a magnetic body. This measuring instrument gives a pulling-in force or a pushing-out force to the probe by controlling a fluid pressure in a probe body. Also, between the permanent magnet attached to the tip end of a movable part of a micrometer attached to the probe body and a plate-shaped member attached to the end part on the side opposite to a contact of the probe, an attraction force according to a distance between the permanent magnet and the plate-shaped member is created.

10 Claims, 9 Drawing Sheets

CONTACT TYPE MEASURING INSTRUMENT

RELATED APPLICATIONS

The present application is based on, and claims priority from, Japanese Application Number 2008-063223 filed Mar. 12,2008,the disclosure of which is hereby incorporated by reference herein in its entirety.

BACKGROUND OF THE INVENTION

1. Field of the Invention

The present invention relates to a contact type measuring instrument provided with a device for adjusting a probe contact force.

2. Description of the Related Art

To measure the three-dimensional profile of a workpiece on a processing machine is of great importance in performing working operation with high accuracy. As a technique for measuring the profile of a workpiece, there has conventionally been known a probe type profile measuring sensor that measures the three-dimensional profile of a workpiece by bringing the tip end of a profile probe into contact with the surface of the workpiece.

The measuring probe of the probe type profile measuring sensor is configured so that the measuring probe is supported by a bearing or an air slide so as to be movable in the axial direction of a probe shaft, and is urged toward an object to be measured by a spring or a pneumatic pressure to apply a preload. Therefore, the contact pressure varies according to a change in probe position, the contact pressure is too high, and it is difficult to freely adjust the contact pressure.

Japanese Patent Application Laid-Open No. 2007-155440 describes a contact type measuring instrument in which an urging space is provided in the bearing part of a probe, and compressed air is supplied to this space to adjust the contact force of the probe that is brought into contact with an object to be measured. This contact type measuring instrument includes an urging device for moving a probe shaft toward the object to be measured by supplying compressed air to the urging space and by giving an urging force to the probe shaft, a minute force measuring device for detecting a minute contact pressure between a contact and the object to be measured, a control section for controlling the urging force of the urging device based on the contact pressure detected by the minute force measuring device, and a displacement measuring device for measuring the position of the contact that is in contact with the object to be measured. This contact type measuring instrument requires control of minute pneumatic pressure to adjust the minute contact force, and is easily affected by very small pulsation of pneumatic pressure.

Besides the above-described contact type measuring instrument in which compressed air is supplied to the urging space provided in the bearing part of the probe, there has been known a contact type measuring instrument in which the contact force of probe is adjusted by using an electromagnet and a permanent magnet. For the contact type measuring instrument of this type, to adjust the contact force, electric currents supplied to respective electromagnets at the front and rear of the probe must be controlled separately, so that a supplementary device for current control is needed. In addition, the electromagnet easily generates heat, and the probe is expanded by this heat generation, so that it is difficult to use this measuring instrument as a measuring instrument that requires submicron or less minute measurement.

In the contact type measuring instrument using a probe, the contact force of the probe with respect to the object to be measured must be adjusted according to the travel speed of the probe and the shape and material of the object to be measured. Also, in the case where the probe is installed in the vertical direction, an influence of the weight of the probe itself must be excluded to obtain a minute contact force.

SUMMARY OF THE INVENTION

Accordingly, an object of the present invention is to provide a contact type measuring instrument having a mechanism that enables fine adjustment of the contact force of a probe and excludes an influence of the gravity of the probe.

To achieve the above object, the present invention provides a contact type measuring instrument which carries out measurement with displacement of a probe in a state in which a contact of the probe is in contact with a surface to be measured, comprising: a probe body for supporting the probe by mean of a hydrodynamic bearing; a fluid pressure control means which controls a fluid pressure in the probe body to give a pulling-in force or a pushing-out force to the probe; and a distance adjusting means attached to the probe body. In this measuring instrument, a permanent magnet is attached to a movable part of the distance adjusting means, and a plate-shaped member made of a material capable of creating a repulsive force or an attraction force between the member and the permanent magnet or a plate-shaped member in which a permanent magnet is embedded is attached to the side of the probe. The configuration may be such that a magnetic body is attached, in place of the permanent magnet, on the side of the movable part of the distance adjusting means, and a permanent magnet or a plate-shaped member in which a permanent magnet is embedded is attached to the side of the probe.

The fluid pressure control means may have a pressure adjusting means for adjusting a fluid pressure supplied into the probe body or a vacuum adjusting means for adjusting the degree of vacuum in the probe body, and pressure fine adjusting means for finely adjusting the inflow or outflow of a fluid into or out of the probe body by means of a valve.

The pressure adjusting means may adjust a fluid pressure supplied to a space in which the plate-shaped member is present, by pressure adjustment using a regulator. The vacuum adjusting means may adjust the degree of vacuum in a space in which the plate-shaped member is present, by means of a vacuum pump. Also, the pressure fine adjusting means may finely adjust the fluid pressure which once has been adjusted by the regulator, with adjustment of an amount of exhaust fluid according to the opening/closing degree of an exhaust valve, or with adjustment of an amount of intake fluid according to the opening/closing degree of an intake valve. The contact force of the contact of the probe with respect to the surface to be measured may be adjusted by a combination of the adjustment of the pulling-in force or the pushing-out force with respect to the probe by using the pressure adjusting means and the pressure fine adjusting means or the vacuum adjusting means and the pressure fine adjusting means and the adjustment of the pulling-in force or the pushing-out force by using the distance adjusting means.

The configuration may be such that the distance adjusting means is a micrometer, and the micrometer is attached to the probe body so that the displacement direction of a movable part of the micrometer is the same as the travel direction of the probe. By the adjustment of displacement of the movable part of the micrometer, a distance between the permanent magnet attached to the movable part and the plate-shaped member attached to the probe is adjusted based on the adjustment of displacement of the movable part of the micrometer, whereby the pulling-in force or the pushing-out force of the permanent magnet with respect to the probe is adjusted.

In the case where the gravity of the probe exerts an influence on the contact force of the probe with respect to the surface to be measured, the gravity of the probe can be canceled by the pushing-out force or the pulling-in force opposite to the gravity direction.

By providing the above-described configuration, the contact type measuring instrument according to the present invention can be provided with a mechanism that enables fine adjustment of the contact force of the probe and excludes an influence of the gravity of the probe.

BRIEF DESCRIPTION OF THE DRAWINGS

The above-mentioned and other objects and features of the present invention will be apparent from the ensuing detailed description given with reference to the accompanying drawings in which.

DETAILED DESCRIPTION OF THE PREFERRED EMBODIMENTS

Figure 1:
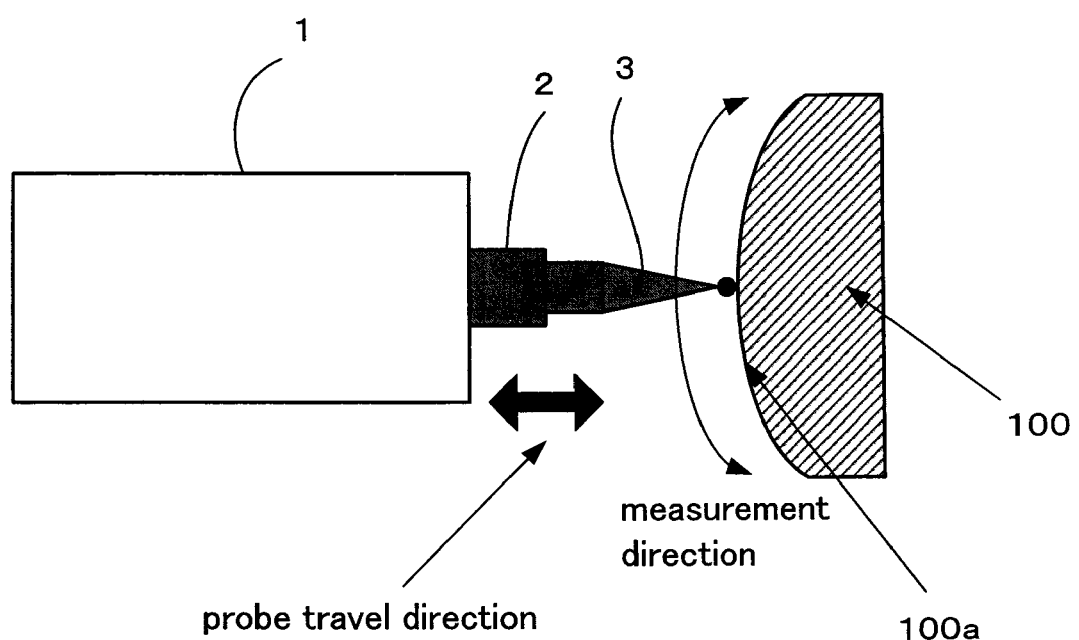
FIG. 1 is an explanatory view for explaining measurement that is carried out by moving a probe while the tip end thereof is in contact with a surface to be measured.

FIG. 1 is an explanatory view for explaining measurement that is carried out by moving a probe while the tip end thereof is in contact with a surface to be measured. In FIG. 1, a contact 3 attached to a probe 2 supported by a hydrodynamic bearing (not shown) moves along a surface 100a to be measured of an object 100 to be measured while being in contact with the surface 100a to be measured, by which the surface profile of the object 100 to be measured is measured.

As the contact 3 of the probe 2 moves in the measurement direction along the surface 100a to be measured, the probe 2 moves in the "probe travel direction" shown in FIG. 1. The movement in the measurement direction of the probe 2 can be executed by moving a probe body 1 with respect to the object 100 to be measured or by moving the object 100 to be measured with respect to the probe body 1.

To the tip end (contact part) of the contact 3 attached to the probe 2, a spherical sapphire ball is attached, for example, as in the conventional contact type measuring instrument, by which the coefficient of friction with the surface 100a to be measured is reduced, and wear is prevented.

Figure 2A:
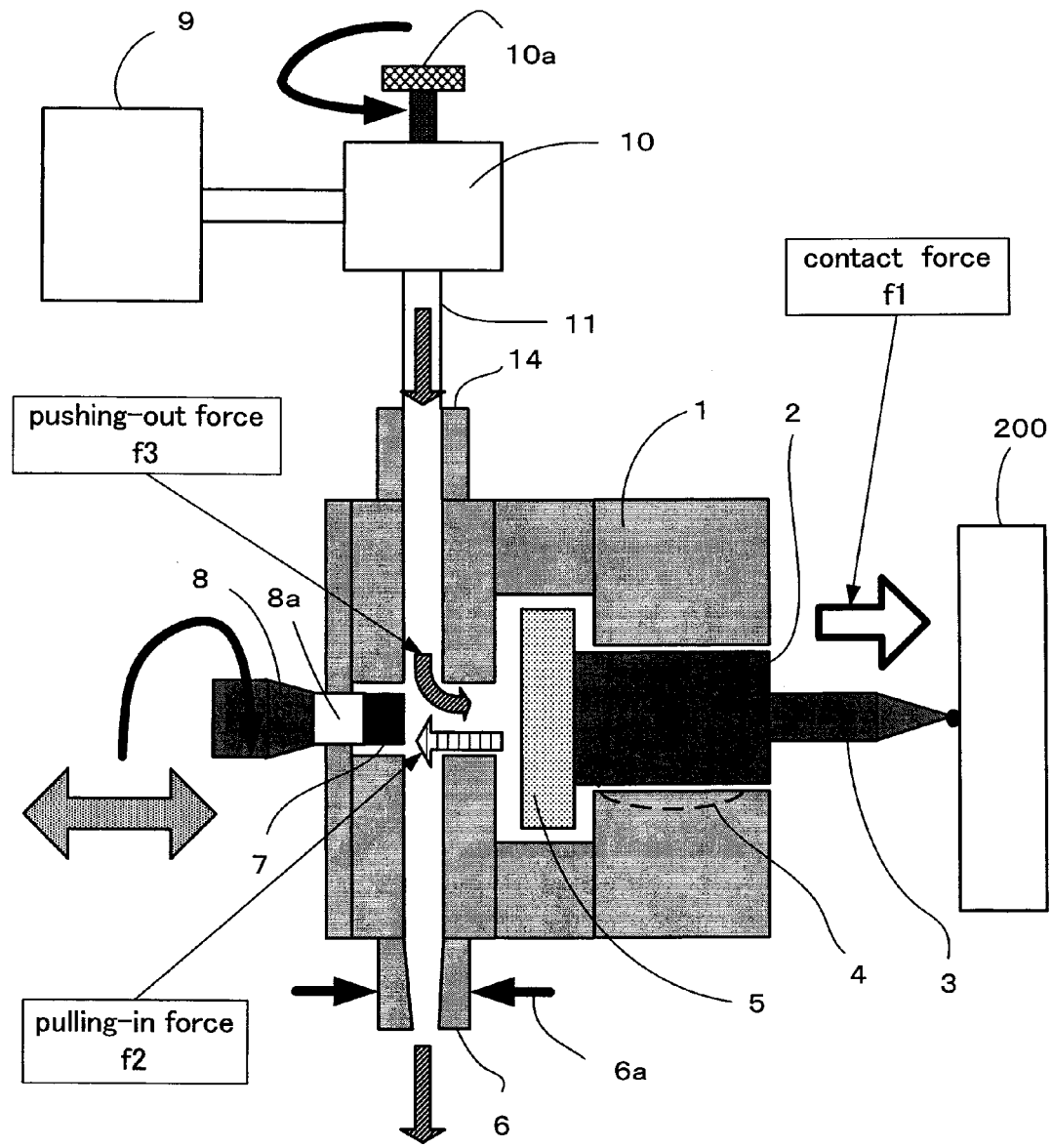
FIG. 2A is an explanatory view of a first embodiment of a contact type measuring instrument according to the present invention, in which the contact force of a probe is adjusted by a force created by compressed air and an attraction force between a permanent magnet and a magnetic body.

FIG. 2A is an explanatory view of a first embodiment of a contact type measuring instrument according to the present invention, in which the contact force of a probe is adjusted by a force created by compressed air and an attraction force between a permanent magnet and a magnetic body. In this contact type measuring instrument, a probe body 1 is provided with a probe 2 having little mechanical friction, which is supported by a hydrodynamic bearing (a hydrodynamic bearing surface 4). In the state in which a contact 3 of the probe 2 and a contact force measuring device 200 are in contact with each other, the pressure of air supplied to the probe 2 is adjusted by a regulator 10 and an exhaust valve 6a, and the attraction force of a permanent magnet 7 with respect to a magnetic body 5 is adjusted, by which fine adjustment of the contact force of the probe 2 with respect to a surface to be measured is carried out. As the contact force measuring device 200, a force sensor or an electronic force balance can be used, for example.

The probe body 1 includes the probe 2, an intake and exhaust port 6 provided with the exhaust valve 6a, a micrometer 8, and a compressed air supply port 14. This probe body 1 is arranged so that the axis of the probe 2 is directed to the horizontal direction as shown in FIG. 2A, so that the gravity of the probe 2 does not act on the contact force measuring device 200. The probe 2 is supported so as to be slidable in the axis direction thereof by the hydrodynamic bearing having the hydrodynamic bearing surface 4 in the probe body 1 in a state in which mechanical friction does not occur.

The contact 3 is mounted on one end of the probe 2, and a spherical sapphire ball is attached to the tip end of the contact 3 as described above. Also, the plate-shaped magnetic body 5 is attached to the other end of the probe 2. The micrometer 8 used as a distance adjusting means having a movable part is attached to the probe body 1 so that a spindle 8a, which is the movable part of the micrometer 8, is positioned on the line in the travel direction of the probe 2. The permanent magnet 7 is attached to the spindle tip end part of the micrometer 8. The micrometer 8, which is an instrument to which, for example, the pitch of a very precise screw is applied, can precisely adjust the distance between the permanent magnet 7 and the magnetic body 5. By adjusting the position of the permanent magnet 7 by using the micrometer 8 to adjust the distance between the permanent magnet 7 and the magnetic body 5, the attraction force acting between the permanent magnet 7 and the magnetic body 5 can be adjusted.

An air compressor 9 supplies compressed air into the probe body 1 through the compressed air supply port 14 via the regulator 10 having a supplied pneumatic pressure adjusting means 10a and further via a compressed air supply pipe 11. The compressed air supplied through the compressed air supply port 14 applies a force to the plate-shaped magnetic body 5, assembled to the probe 2, in the direction such that the probe 2 is pushed out of the probe body 1. The magnetic body 5 is attached to the end part of the probe 2 on the side opposite to the contact 3. The compressed air supplied from the air compressor 9 into the probe body 1 is released to the outside of the probe body 1 through the intake and exhaust port 6 and the hydrodynamic bearing surface 4. The exhaust valve 6a, which is provided in the intake and exhaust port 6, adjusts the quantity of compressed air flowing out per unit time through the intake and exhaust port 6. The hydrodynamic bearing surface 4 may be supplied with a fluid for bearing from a means for supplying fluid for bearing, not shown, or the compressed air supplied from the air compressor 9 may be used as a fluid for bearing via a pressure adjusting means.

On the magnetic body 5 assembled to the probe 2, a pushing-out force f3 caused by the compressed air and a pulling-in force f2, which is an attraction force acting between the magnetic body 5 and the permanent magnet 7 attached to the spindle tip end of the micrometer 8, act. The pushing-out force f3 is a force that pushes the probe 2 to the outside of the probe body 1, and the pulling-in force f2 is a force that pulls the probe 2 to the inside of the probe body 1. Therefore, a contact force f1, which is a force exerted on the contact force measuring device 200 by the contact 3 attached to the probe 2, can be expressed by Equation 1.

$$f1 = f3 - f2 \quad (1)$$

From Equation 1, the contact force f1 of the contact 3 can be adjusted freely by adjusting the magnitudes of the pulling-in force f2 and the pushing-out force f3.

Figure 2B:
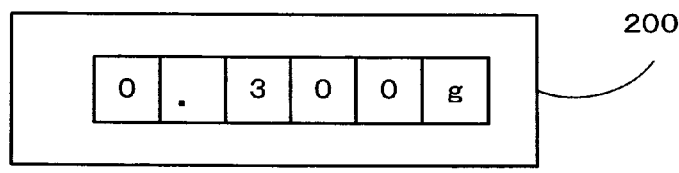
FIG. 2B is a schematic view showing one example of a display screen on which the contact force of the contact type measuring instrument shown in FIG. 2A, measured by a contact force measuring device, is displayed.

FIG. 2B is a schematic view showing one example of a display screen on which the contact force of the contact type measuring instrument measured by the force sensor or the electronic force balance, which is the contact force measuring device 200, is displayed. The displayed contact pressure is 0.300 g. This numeric value is one example, and holds no special meaning.

Figure 3:
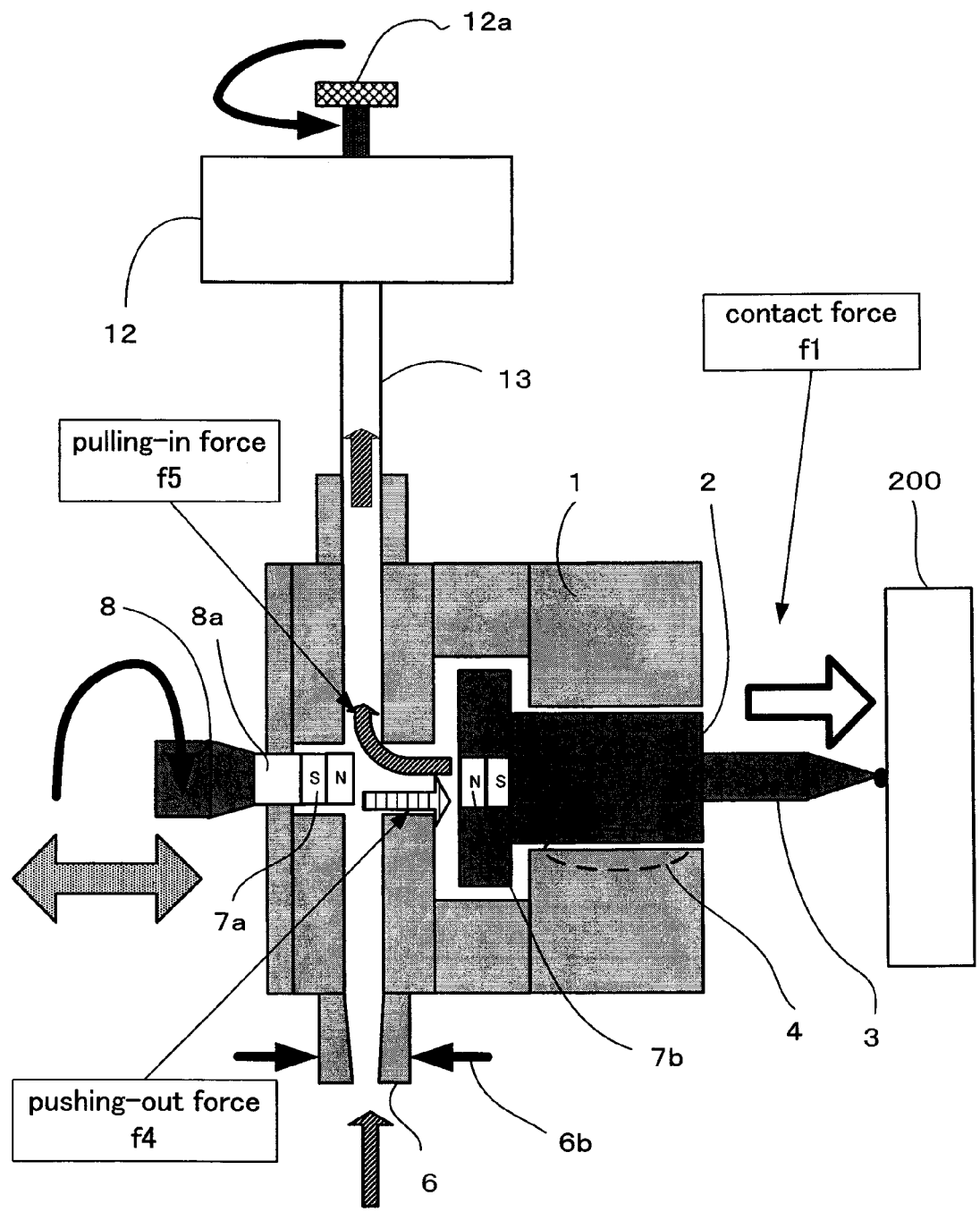
FIG. 3 is an explanatory view of a second embodiment of a contact type measuring instrument according to the present invention, in which the contact force of a probe in the contact type measuring instrument is adjusted by a force created by evacuation and a repulsive force of a permanent magnet.

FIG. 3 is an explanatory view of a second embodiment of the contact type measuring instrument according to the present invention, in which the contact force of a probe in a contact type measuring instrument is adjusted by a force created by evacuation and a repulsive force of a permanent magnet. In this contact type measuring instrument, a probe body 1 is provided with a probe 2 having little mechanical friction, which is supported by a hydrodynamic bearing (a hydrodynamic bearing surface 4). In the state in which a contact 3 of the probe 2 and a contact force measuring device 200 are in contact with each other, the repulsive force between a permanent magnet 7a and a permanent magnet 7b is adjusted using the contact force measuring device 200, and the attraction force created by a vacuum pump 12 and an intake valve 6b is adjusted, by which fine adjustment of the contact force of the probe 2 with respect to a surface to be measured is carried out.

The second embodiment of the contact type measuring instrument shown in FIG. 3 differs from the first embodiment thereof shown in FIG. 2A in that, in place of the magnetic body 5, the permanent magnet 7b is attached to the probe 2, that the pneumatic pressure in the probe body 1 is reduced by evacuation using the vacuum pump 12, by which a pulling-in force f5 is created on the probe 2, and that the repulsive force is created between the permanent magnet 7a attached to a micrometer 8 and the permanent magnet 7b attached to the probe 2. The repulsive force is a pushing-out force f4 that pushes the probe 2 to the outside of the probe body 1.

The degree of vacuum can be adjusted by the degrees of throttle of a vacuum adjusting means 12a provided on the vacuum pump 12 and the intake valve 6b provided in an intake and exhaust port 6.

Therefore, a contact force f1, which is a force exerted on the contact force measuring device 200 by the contact 3 attached to the probe 2, can be expressed by Equation 2.

$$f1 = f4 - f5 \quad (2)$$

From Equation 2, the contact force f1 of the contact 3 can be adjusted freely by adjusting the magnitudes of the pulling-in force f5 and the pushing-out force f4.

Figure 4:
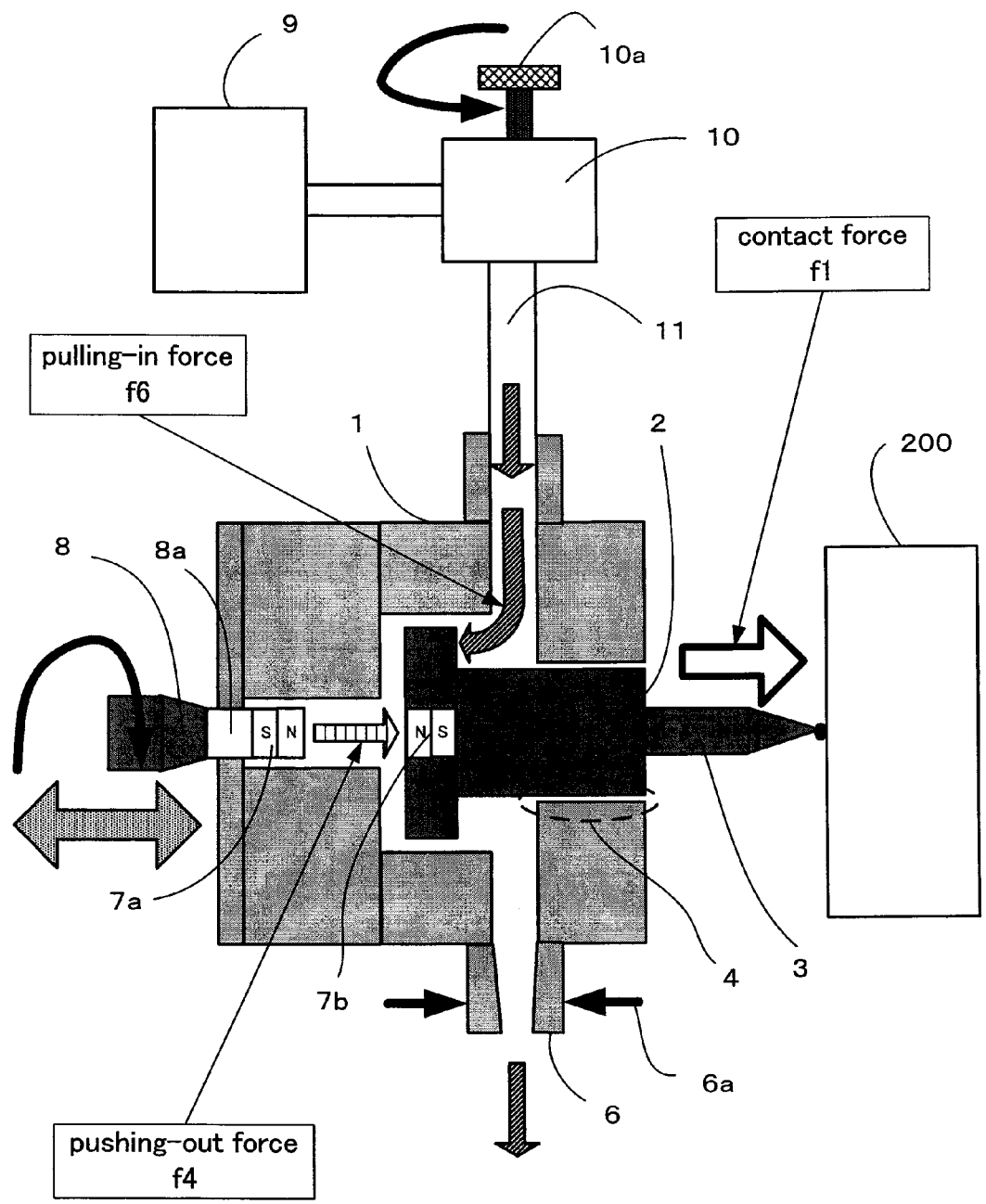
FIG. 4 is an explanatory view of a third embodiment of a contact type measuring instrument according to the present invention, in which the contact force of a probe is adjusted by a repulsive force of a permanent magnet and a pulling-in force created according to the area of the surface receiving the pressure of air supplied.

FIG. 4 is an explanatory view of a third embodiment of a contact type measuring instrument according to the present invention, in which the contact force of a probe is adjusted by a repulsive force of a permanent magnet and a pulling-in force created according to the area of the surface receiving the pressure of supplied air. In this contact type measuring instrument, a probe body 1 is provided with a probe 2 having little mechanical friction, which is supported by a hydrodynamic bearing. The repulsive force between a permanent magnet 7a and a permanent magnet 7b is adjusted and also the pulling-in force to be created, in place of the attraction force created by the vacuum pump 12 (refer to FIG. 3), and an exhaust valve 6a are adjusted in the state in which a contact 3 of the probe 2 and a contact force measuring device 200 are in contact with each other, by changing the surface receiving the pressure of supplied air from the surface of the permanent magnet 7b on the side opposite to the probe to the surface of the permanent magnet 7b on the side of the probe (with the result that pressure receiving area is decreased by the amount equivalent to the cross-sectional area of the probe 2).

In the third embodiment shown in FIG. 4, compressed air is supplied to the probe body 1 so that the force exerted on the probe 2 becomes a pulling-in force f6. The repulsive force created by the permanent magnets 7a and 7b exerts a pushing-out force f4 on the probe 2. Therefore, a contact force f1, which is a force exerted on the contact force measuring device 200 by the contact 3 attached to the probe 2, can be expressed by Equation 3.

$$f1 = f4 - f6 \quad (3)$$

From Equation 3, the contact force f1 of the contact 3 can be adjusted freely by adjusting the magnitudes of the pulling-in force f6 and the pushing-out force f4.

Figure 5:
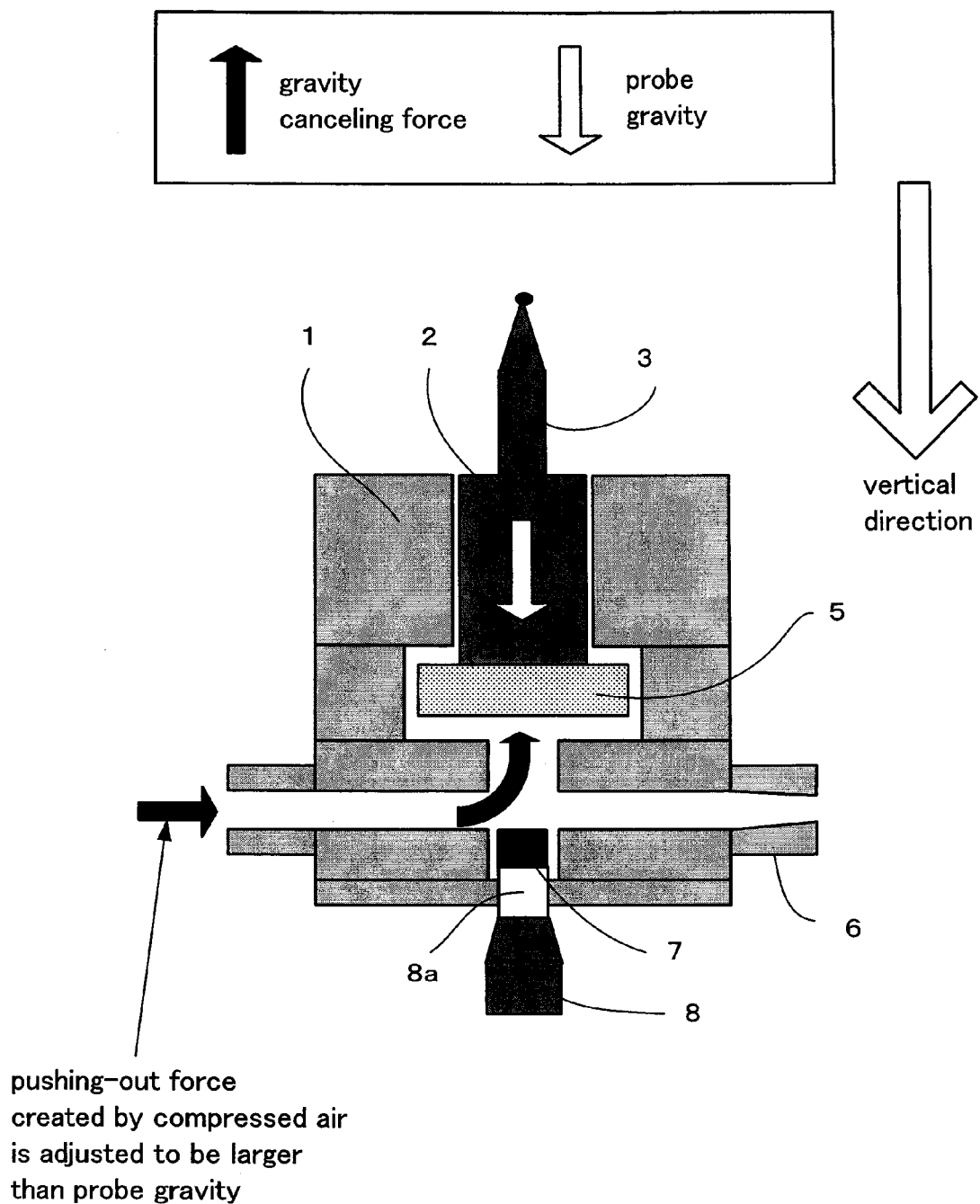
FIG. 5 is an explanatory view for explaining a method for canceling the gravity of a probe by means of a pushing-out force created by supplied air.

FIG. 5 is an explanatory view for explaining a method for canceling the gravity of a probe 2 by giving to the probe 2 an upward force in the vertical direction having the same magnitude as that of the gravity of the probe 2 by the repulsive force between a permanent magnet and a magnetic body in the case where the probe 2 is attached to a probe body 1 in the vertical direction and the tip end of the probe 2 is directed upward in the vertical direction. In FIG. 5, a permanent magnet 7 is attached to a spindle 8a of a micrometer 8, and a plate-shaped magnetic body 5 is attached to the probe 2. By using the repulsive force created between the permanent magnet 7 and the magnetic body 5, the gravity of the probe 2 (and structures such as a contact 3 and the magnetic body 5 that are integral with the probe 2) is canceled.

Figure 6:
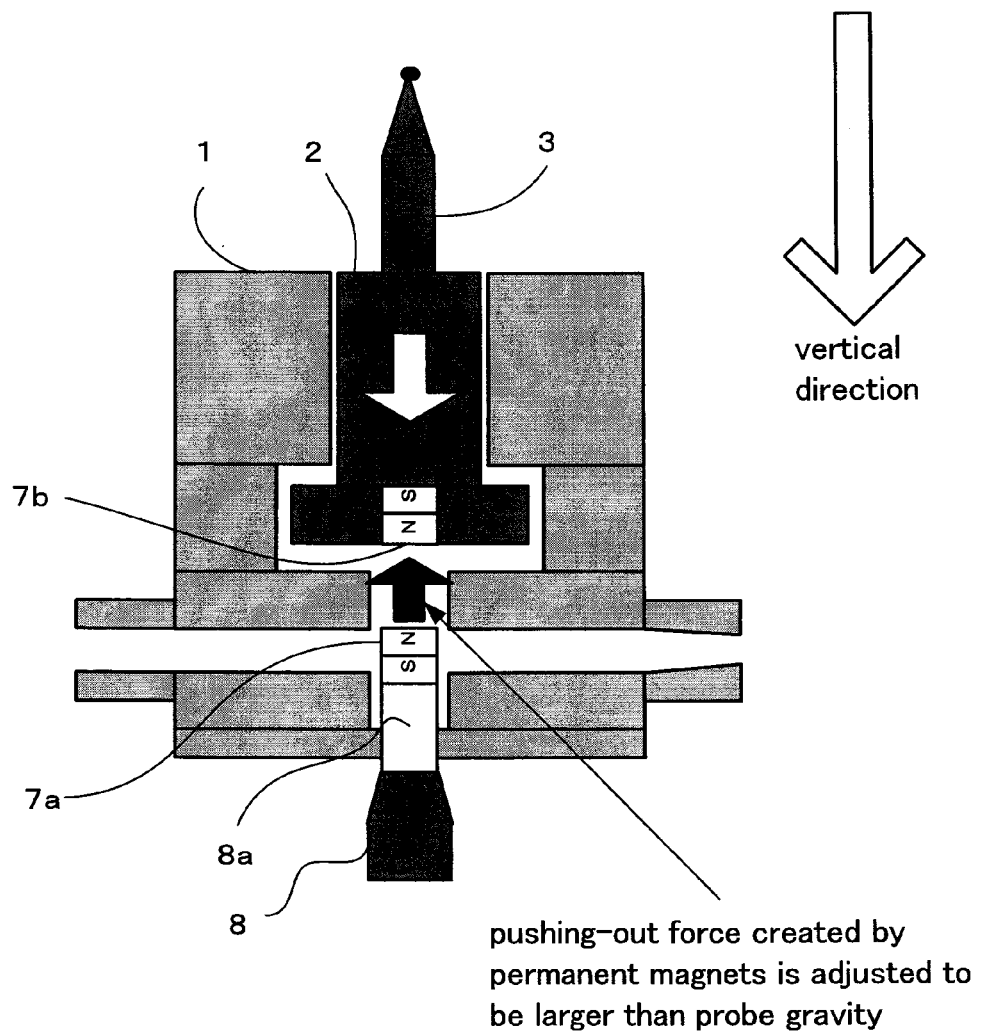
FIG. 6 is an explanatory view for explaining a method for canceling the gravity of a probe by means of a pushing-out force created by permanent magnets.

FIG. 6 is an explanatory view for explaining a method for canceling the gravity of a probe 2 by giving to the prove 2 an upward force in the vertical direction having the same magnitude as that of the gravity of the probe 2 by the repulsive force between permanent magnets in the case where the probe 2 is attached to a probe body 1 in the vertical direction and the tip end of the probe 2 is directed upward. In FIG. 6, a permanent magnet 7a is attached to a spindle 8a of a micrometer 8, and a permanent magnet 7b is attached to the probe 2. By using the repulsive force created between the permanent magnet 7a and the permanent magnet 7b, the gravity of the probe 2 (and structures such as a contact 3 and the permanent magnet 7b that are integral with the probe 2) is canceled.

Figure 7:
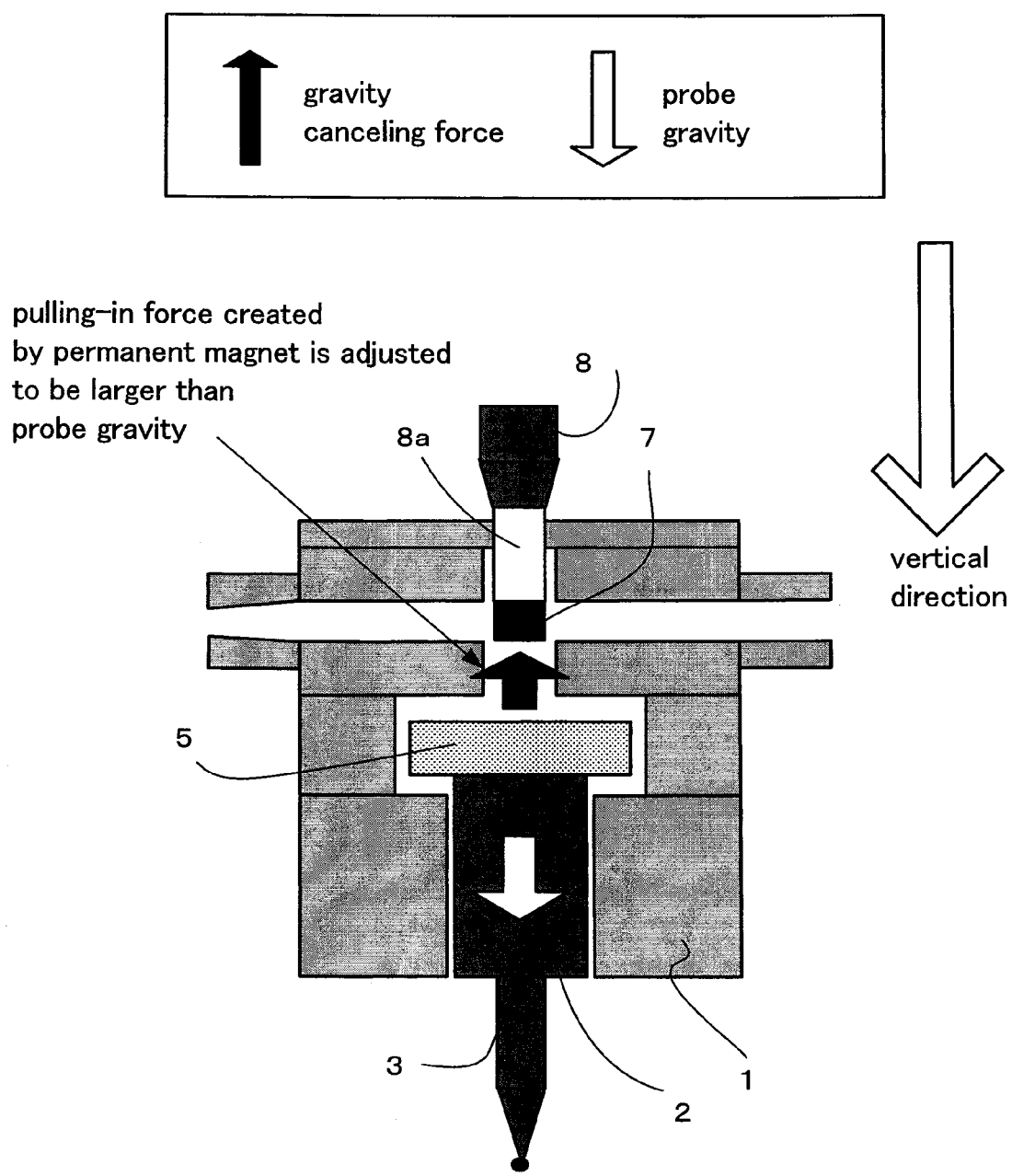
FIG. 7 is an explanatory view for explaining a method for canceling the gravity of a probe by means of a pulling-in force created by a permanent magnet.

FIG. 7 is an explanatory view for explaining a method for canceling the gravity of a probe 2 by giving to the prove 2 an upward force in the vertical direction having the same magnitude as that of the gravity of the probe 2 by the repulsive force between a permanent magnet and a magnetic body in the case where the probe 2 is attached to a probe body 1 in the vertical direction and the tip end of the probe 2 is directed downward. In FIG. 7, a permanent magnet 7 is attached to a spindle 8a of a micrometer 8, and a plate-shaped magnetic body 5 is attached to the probe 2. By using the attraction force created between the permanent magnet 7 and the magnetic body 5, the gravity of the probe 2 (and structures such as a contact 3 and the magnetic body 5 that are integral with the probe 2) is canceled.

Figure 8:
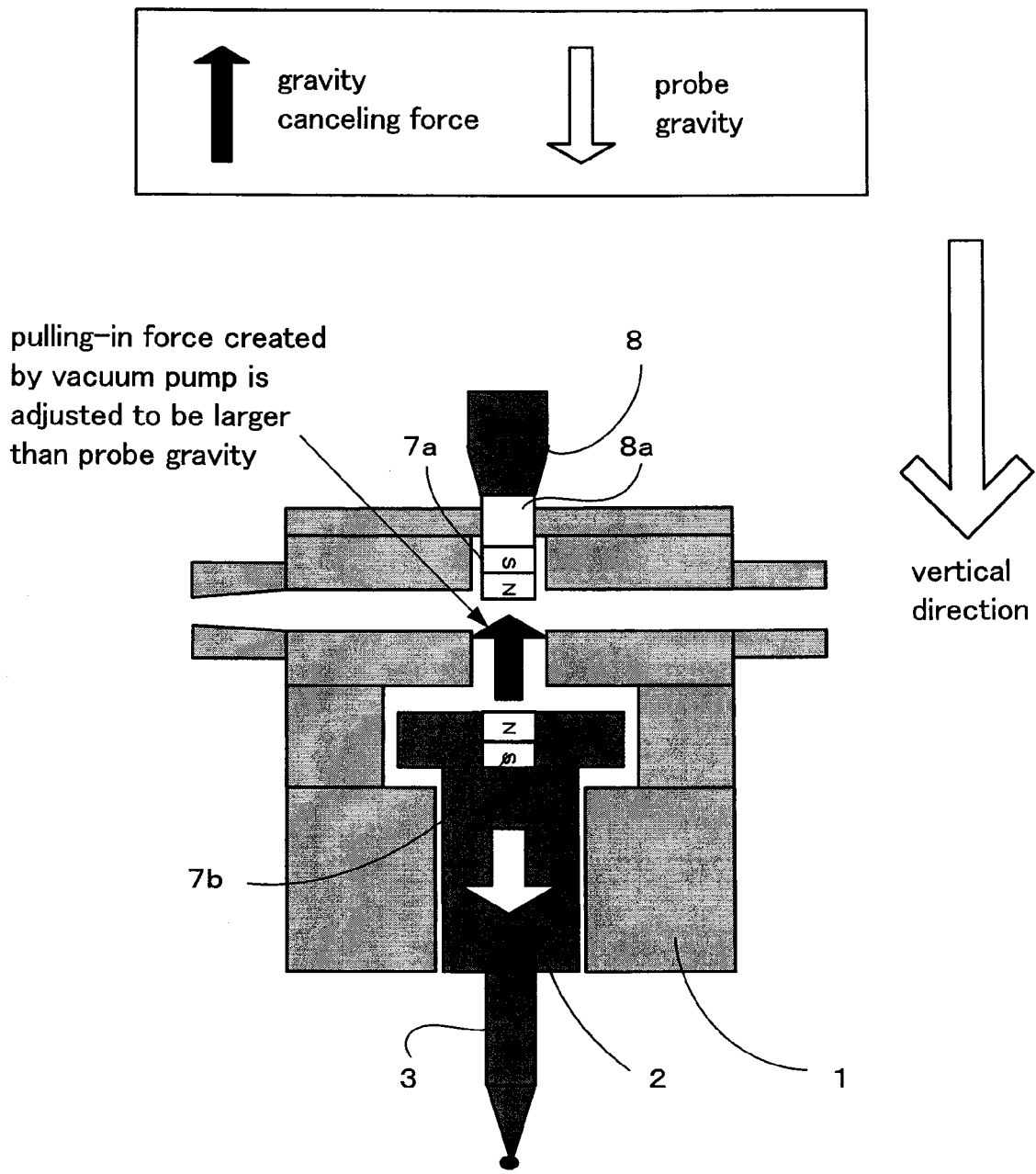
FIG. 8 is an explanatory view for explaining a method for canceling the gravity of a probe by means of a pulling-in force created by a vacuum pump.

FIG. 8 is an explanatory view for explaining a method for canceling the gravity of a probe 2 (and structures such as a contact 3 that are integral with the probe 2) by giving to the prove 2 an upward force in the vertical direction having the same magnitude as that of the gravity of the probe 2 by the attraction force created by the vacuum pump 12 (refer to FIG. 3) in the case where the probe 2 is attached to a probe body 1 in the vertical direction and the tip end of the probe 2 is directed downward.

Figure 9:
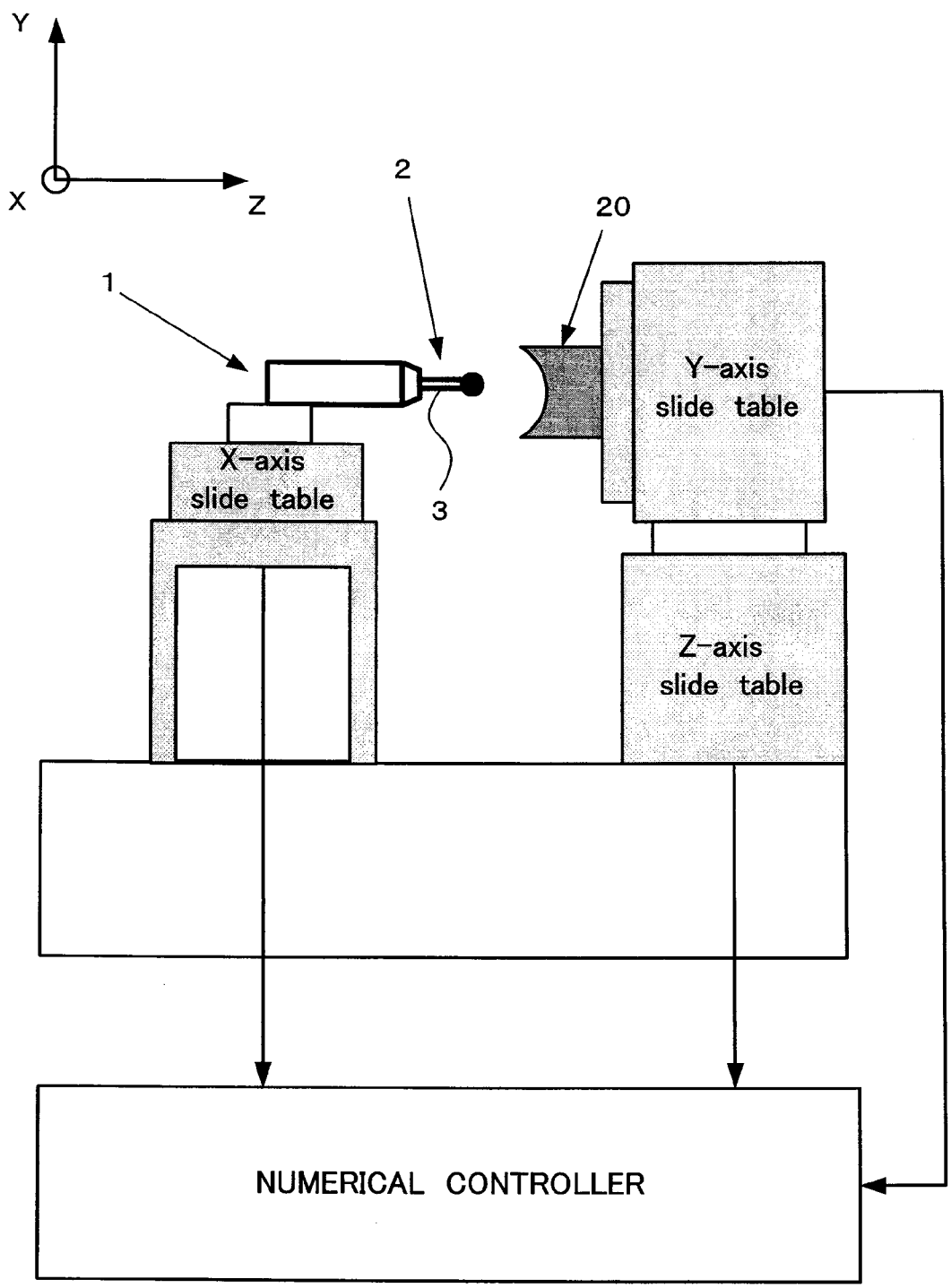
FIG. 9 is an explanatory view for explaining measurement of the profile of a workpiece, which has been worked, on a machine tool by using a contact type measuring instrument according to the present invention.

FIG. 9 is an explanatory view for explaining measurement of the profile of a workpiece, which has been worked, on a machine tool by using the contact type measuring instrument according to the present invention (hereinafter, referred to as "on-machine measurement"). To measure the profile or the like of a workpiece, which has been worked by a machine tool, on the machine tool, a contact type probe body 1 of the contact type measuring instrument according to the present invention is attached on a travel axis of the machine tool. In FIG. 9, the contact type probe body 1 is mounted on a slide table of the X axis, which is one of the travel axes of the machine tool.

The profile measurement of a workpiece 20 can be carried out while the surface of the workpiece 20 is traced by a contact 3 of a probe 2 of the contact type probe body 1 by utilizing a working program prepared when the workpiece 20 is worked by the machine tool or a working program which has been thinned out (a program in which working blocks are simplified by setting a predetermined error range so as to avoid frequent acceleration and deceleration of tool).

Even in the case where a worked profile of the workpiece 20 is different from a profile to be required by the working program for reasons of vibration, tool abnormality and the like, the error is merely several micrometers in the ultraprecise working operation requiring on-machine measurement. Therefore, a change in contact force at the time when measurement is carried out, after fine adjustment of contact force of the contact type measuring instrument, is negligibly small. In case where a large change in contact force occurs, it is considered that a considerably large displacement of the probe 2 occurs, in consequence of this, measurement of the workpiece 20 is interrupted, considering that processing of the workpiece 20 ended up in failure. At this time, in the case where the displacement of the probe 2 measured by using a sensor capable of measuring displacement, such as a laser interferometer or a capacitive sensor, is not smaller than the set value, a signal is sent to a numerical controller (refer to FIG. 9) for the machine tool to stop the measurement.

The contact type measuring instrument according to the present invention can execute on-machine measurement by adjusting the contact force of the probe (contact) by using the contact force measuring device such as a force sensor or an electronic force balance.

The invention claimed is:

1. A contact type measuring instrument which carries out measurement with displacement of a probe in a state in which a contact of the probe is in contact with a surface to be measured, comprising:
a probe body for supporting the probe by mean of a hydrodynamic bearing;
a fluid pressure control means which controls a fluid pressure in the probe body to give a pulling-in force or a pushing-out force to the probe;
a distance adjusting means attached to the probe body and having a movable part;
a permanent magnet attached to the movable part of the distance adjusting means; and
a member, attached to the end part of the probe on the side opposite to the contact, for creating a repulsive force or an attraction force between the member and the permanent magnet.

2. The contact type measuring instrument according to claim 1, wherein said member is a magnetic body metal or a plate-shaped member in which a permanent magnet is incorporated.

3. The contact type measuring instrument according to claim 1, wherein said fluid pressure control means has a pressure adjusting means for adjusting a fluid pressure supplied into the probe body or a vacuum adjusting means for adjusting the degree of vacuum in the probe body, and pressure fine adjusting means for finely adjusting the inflow or outflow of a fluid into or out of the probe body by means of a valve.

4. The contact type measuring instrument according to claim 3, wherein said pressure adjusting means adjusts a fluid pressure supplied to a space in which the magnetic body metal of the probe or the plate-shaped member in which a permanent magnet is incorporated is present, by pressure adjustment using a regulator.

5. The contact type measuring instrument according to claim 3, wherein said vacuum adjusting means adjusts the degree of vacuum in a space in which the magnetic body metal of the probe or the plate-shaped member in which a permanent magnet is incorporated is present, by means of a vacuum pump.

6. The contact type measuring instrument according to claim 3, wherein the contact force of the contact of the probe with respect to the surface to be measured is adjusted by a combination of the adjustment of the pulling-in force or the pushing-out force with respect to the probe by using the pressure adjusting means and the pressure fine adjusting means or the vacuum adjusting means and the pressure fine adjusting means and the adjustment of the pulling-in force or the pushing-out force by using the distance adjusting means.

7. The contact type measuring instrument according to claim 1, wherein the distance adjusting means adjust an distance between the magnetic body metal or plate-shaped member in which a permanent magnet is incorporated and the permanent magnet attached to the tip end of the movable part of the micrometer carrying out a micro adjustment of displacement, based on the adjustment of displacement of the movable part of the micrometer, the displacement direction of a movable part of the micrometer being the same as the travel direction of the probe, whereby the pulling-in force or the pushing-out force of the permanent magnet with respect to the probe is adjusted.

8. The contact type measuring instrument according to claim 1, wherein in the case where the gravity of the probe exerts an influence on the contact force of the probe with respect to the surface to be measured, the gravity of the probe is canceled by the pushing-out force or the pulling-in force opposite to the gravity direction.

9. A contact type measuring instrument which carries out measurement with displacement of a probe in a state in which a contact of the probe is in contact with a surface to be measured, comprising:

a probe body for supporting the probe by mean of a hydrodynamic bearing;

a fluid pressure control means which controls a fluid pressure in the probe body to give a pulling-in force or a pushing-out force to the probe; and a distance adjusting means attached to the probe body and having a movable part;

a member attached to the movable part of the distance adjusting means; and a permanent magnet, attached to the end part of the probe on the side opposite to the contact, for creating a repulsive force or an attraction force between the permanent magnet and the member.

10. The contact type measuring instrument according to claim 9, wherein said pressure fine adjusting means finely adjusts the fluid pressure which once has been adjusted by the regulator, with adjustment of an amount of exhaust fluid according to the opening/closing degree of an exhaust valve, or with adjustment of an amount of intake fluid according to the opening/closing degree of an intake valve.

\* \* \* \* \*